Feb. 19, 1957 R. W. BEART 2,781,812
HELICAL SPLIT RING BITING TOOTH WASHER ADAPTED
TO BE RETAINED ON A ROTARY FASTENER
Filed May 4, 1955
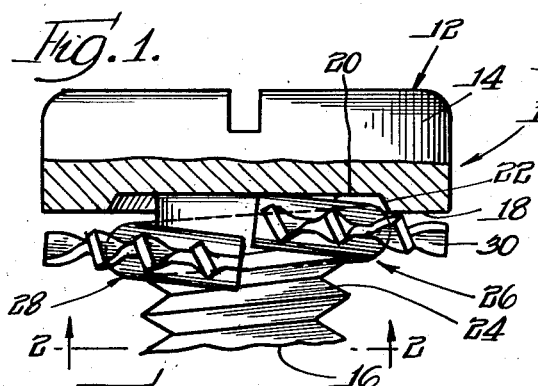
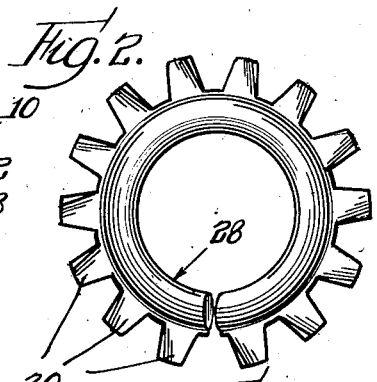
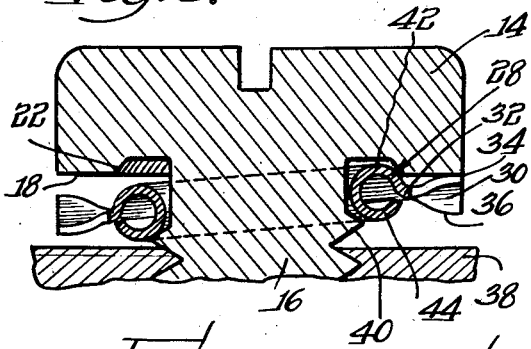
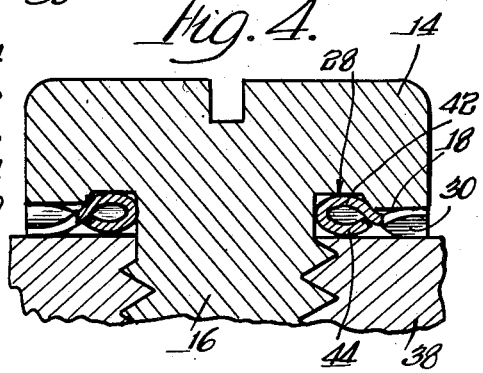
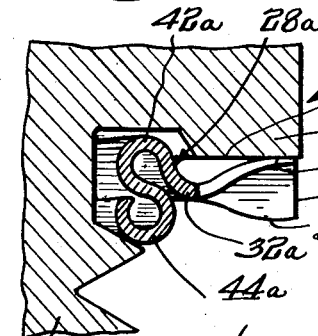
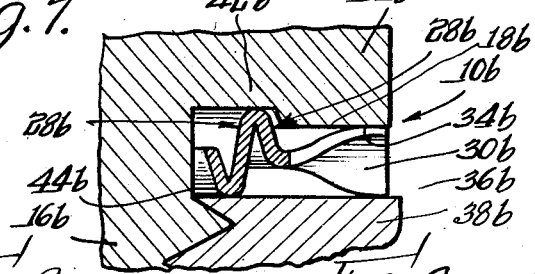
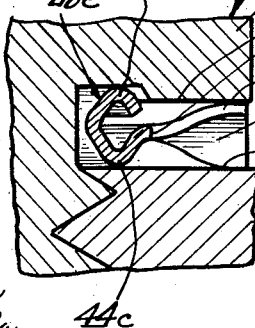
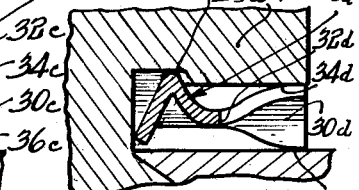
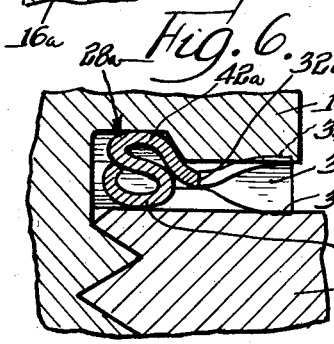
INVENTOR.
Robert W. Beart
BY: Olson & Trexler
Attys.

United States Patent Office 2,781,812
Patented Feb. 19, 1957

2,781,812

HELICAL SPLIT RING BITING TOOTH WASHER ADAPTED TO BE RETAINED ON A ROTARY FASTENER

Robert W. Beart, Park Ridge, Ill., assignor to Illinois Tool Works, Chicago, Ill., a corporation of Illinois Application May 4, 1955, Serial No. 505,980

7 Claims. (Cl. 151—35)

The present invention relates to a novel lock washer and preassembled fastener unit, and more particularly, to a novel lock washer of the split-ring type and a novel preassembled unit including a threaded rotary fastener member such as a screw or a nut and the novel split-ring type lock washer.

The present invention contemplates a novel unit including a rotary fastener member and a split-ring lock washer having a helically twisted body portion, which unit is constructed so as to have substantially improved resistance to unauthorized loosening. More particularly, the present invention contemplates a novel lock washer and preassembled fastener unit wherein the split-ring lock washer is provided with tooth elements engageable with the fastener member and a workpiece, which tooth elements cooperate with the spring action provided by the helical washer body portion to provide a relatively great resistance to unauthorized retrograde movement of the fastener member.

It has been found that when fastening units of the above described type are loosened or removed from a workpiece, the split-ring washer body tends to spread apart or uncoil. Therefore, it is another important object of the present invention to provide a novel preassembled fastener unit including a fastener member and a split-ring type washer having locking teeth, which fastener member and washer are constructed so as to prevent the washer body from spreading when the unit is removed from the work so that the unit may be re-used or reapplied.

Still another object of the present invention is to provide a novel lock washer and preassembled fastener unit of the above described type wherein the body portion of the washer is formed so as to provide relatively great resistance to collapsing of the helical shape thereof so as to further improve the locking characteristics of the washer.

Still another object of the present invention is to provide a lock washer and unit of the above described type wherein the fastener member and lock washer are constructed so that they may be easily interconnected in preassembled relationship.

Still another object of the present invention is to provide a novel lock washer of the above described type wherein the body portion is constructed so as to restrain undue collapsing of the locking teeth.

Other objects and advantages of the present invention will become apparent from the following description and the accompanying drawings wherein:

Fig. 1 is a fragmentary elevational view partially broken away showing a preassembled fastening unit embodying the principles of this invention;

Fig. 2 is an end view of the novel washer as seen from line 2—2 in Fig. 1;

Fig. 3 is a sectional view showing the unit of Fig. 1 initially applied to a workpiece;

Fig. 4 is a sectional view showing the fastening unit clamped against a workpiece;

Fig 5 is a fragmentary sectional view showing a modified form of the present invention;

Fig. 6 is a fragmentary sectional view showing the embodiment of Fig. 5 clamped against a workpiece;

Fig. 7 is a fragmentary sectional view showing another modified form of the present invention in position to be clamped against a workpiece;

Fig. 8 is a fragmentary sectional view showing a further modified form of the present invention in position to be clamped against a workpiece; and Fig. 9 is a fragmentary sectional view showing still another modified form of the present invention.

Referring now more specifically to the drawings wherein like parts are designated by the same numerals throughout the various figures, a preassembled fastener unit 10 embodying the principles of this invention is shown in Figs. 1 through 4. The fastener unit 10 includes a threaded rotary fastener member such as a screw 12 having a head portion 14 and a shank portion 16. The head portion has a generally radially extending clamping face 18 with an annular recess 20 therein partially defined by a generally axially extending wall 22 for the purpose set forth below. Helical thread convolutions 24 are formed on the shank portion 16. A split-ring type washer 26 is trapped on the shank portion adjacent the clamping face 18.

The lock washer 26 which is preferably formed from sheet spring steel includes a split helically twisted body portion 28, and a plurality of circumferentially spaced prongs 30 extending generally radially from a margin 32 of the body portion. Each of the prongs 30 is twisted about its radial axis so as to present axially deflected tooth edges, 34 and 36 respectively for engaging the clamping face 18 and the surface of a workpiece 38. The body portion 28 is formed so that its internal diameter is less than the outer diameter of the thread convolutions 24 so that it cooperates with the endmost thread convolution 40 adjacent the head portion 14 to maintain the screw member and washer in preassembled relaionship. It should be particularly noted that the body portion 28 is formed so that portions 42 and 44 thereof project axially of opposite sides of the margin 32 and present axially oppositely facing curved surfaces respectively engageable with the workpiece and the fastener head. In this embodiment the portions 42 and 44 are provided by forming the body so that it has a substantially circular radial cross sectional shape. The ends of the washer body are only slightly circumferentially spaced and are preferably disposed in axially overlapping relationship as shown in Figs. 1 and 2 so as to provide a substantially closed ring for preventing entanglement or interlocking of the washer with other washers when, for example, such washers are stored in bulk prior to assembly with a fastener.

When the fastener unit is initially applied to a workpiece as shown in Fig. 2, one end of the body portion 42 will project into the annular recess of the clamping face and engage the bottom of the recess, and an opposite end of the body portion 44 will engage the workpiece surface. The curved work and fastener engaging surfaces of the portions 42 and 44 facilitate turning of the fastener during initial tightening of the unit and reduce the possibility of marring the workpiece. Upon tightening of the screw member, the helically twisted shape of the washer body will be progressively collapsed or flattened so that the body provides a progressively increasing spring action tending to lock the screw member against retrograde movement. By forming the washer body with axially extending portions, the stiffness of the body and, therefore, its locking action is increased both as the result of the cross sectional shape of the body and as a result of the increase in sheet material stock included in the body.

As the helical shape of the washer body is collapsed the tooth elements or prongs 30 are progressively clamped between the face 18 of the screw member head portion and the workpiece to provide an increasing positive locking action tending to hold the screw member against retrograde movement. Furthermore, after the helical shape of the body has been substantially flattened, further tightening of the screw member causes the axially spaced body portions 42 and 44 to be collapsed toward each other as shown in Fig. 4 so as to provide an additional spring action tending to lock the screw member against unauthorized retrograde movement. The axially spaced portions 42 and 44 of the body also provide resilient abutment means which serves to reduce any possibility that the screw member may be tightened sufficiently to flatten the locking prongs 30 to the point where their locking effectiveness will be materially impaired.

As will be undestood, it is often desirable to remove the fastening unit 10 from the workpiece and then to replace the fastening unit. It has been found that when the screw member is loosened, there is a tendency for the washer body to uncoil or straighten out since the tooth edges adjacent one end of the body and engaging the workpiece tend to hold this end of the body fixed with respect to the workpiece, and the tooth edges adjacent the opposite end of the body and engaging the screw member clamping face tend to hold this end of the washer body fixed with respect to the screw member. However, with the structure of the present invention, this tendency is overcome and injury to the washer is avoided since the portion 42 of the washer body projecting into the recess in the clamping face cooperates with the recess wall 22 to maintain the generally annular shape of the washer body, or in other words, to prevent the washer body from uncoiling. It is to be understood, however, that the washer may also be used in many installations with a fastener having a planar clamping surface, particularly when removal of the fastener is not contemplated.

Figs. 5 and 6 show a modified form of the present invention which is similar to the above described structure as indicated by the application of identical reference numerals with the suffix "a" added to corresponding elements. This embodiment differs only in that the washer body portions 42a and 44a are formed so that the body has a radial cross section substantially in the shape of a figure 8. It will be appreciated that this structure adds a considerable amount of stock material to the washer body and also increases the amount of stock material which extends generally axially of the washer axis whereby to increase the stiffness and, therefore, the locking ability of the split-ring washer body.

Fig. 7 shows another modified form of the present invention which is similar to the above described structures as indicated by the application of identical reference numerals with the suffix "b" added to corresponding elements. This embodiment differs only in the radial cross sectional shape of the body portions 42b and 44b. More specifically, the portion 42b has an inverted generally V-shaped radial cross section and the portion 44b has an upright generally V-shaped radial cross section. In addition, these body portions are integrally interconnected so that they are radially offset from each other. This structure improves the stiffness and, therefore, the locking action of the washer body as compared with the washer body 28 since the legs of the V's extend generally axially of the washer axis. However, the legs of the V's are flared radially sufficiently to permit the portions 42b and 44b to be axially compressed toward each other.

Fig. 8 shows another modified form of the present invention which is similar to the structure shown in Fig. 7 as indicated by the application of identical reference numerals with the suffix "c" added to corresponding elements. This embodiment differs from the embodiment shown in Fig. 7 in that the body portions 42b and 44b which respectively have inverted and upright generally V-shaped radial cross section are integrally joined so that they are in substantially axial alignment with each other.

It will be noted that in each of the above described embodiments the body portions 42 and 44 and the portions corresponding thereto project substantially equal distances axially of opposite sides of the plane coincident with the roots of the prongs. With this arrangement the washers may be selectively assembled with the screw member with either of their sides adjacent the clamping face of the screw member since both of the axially projecting body portions are adapted to extend into the recess in the clamping face and cooperate with the generally axially extending recess wall. However, Fig. 9 shows an embodiment of the present invention which is formed so that only one side thereof should be positioned adjacent the clamping face of the screw member. More specifically, Fig. 9 shows a structure which is similar to the above described structures as indicated by the application of identical reference numerals with the suffix "d" added to corresponding elements, except that the above described body portion 44 has been eliminated. While the stiffness and, therefore, the locking power of the body 28d is reduced as compared with the body portions described above, the fastener unit 10d may be used for many purposes and has the advantage of requiring less stock material for the washer body.

While the preferred embodiments of the present invention have been shown and described herein, it is obvious that many structural details may be changed without departing from the spirit and scope of the appended claims.

The invention is claimed as follows:

1. A sheet metal lock washer comprising a helically twisted split-ring body having adjacently disposed ends providing a substantially closed ring for preventing entanglement of the washer with other washers when such washers are stored in bulk, a helically twisted split-ring section having one margin integral with said body, and axially deflected tooth elements extending radially from an opposite margin of said split-ring section, said body having a resiliently collapsible radial cross section including axially spaced portions respectively projecting axially of opposite sides of roots of said tooth elements for increasing resistance of said body to helical collapsing and for providing a resilient abutment for obtaining additional spring locking action and for preventing complete collapsing of said tooth elements when the washer is clamped between a workpiece and a rotary fastener head, said axially spaced portions presenting axially oppositely facing surfaces which are curved in radial cross section and are spaced axially of opposite sides of said roots for respectively engaging a workpiece and a rotary fastener head for facilitating initial tightening of the rotary fastener and minimizing marring of a workpiece.

2. A sheet metal lock washer, as defined in claim 1, wherein said body ends axially overlap each other for insuring substantial closing of the ring.

3. A sheet metal lock washer, as defined in claim 1, wherein said axially spaced portions respectively project axially outwardly of opposite sides of tooth edges of said tooth elements for engaging a workpiece and a rotary fastener head prior to engagement of the tooth edges with a workpiece and a rotary fastener head.

4. A sheet metal lock washer, as defined in claim 1, wherein said body cross section is substantially circular and projects substantially equally axially of opposite sides of said tooth element roots.

5. A sheet metal lock washer, as defined in claim 1, wherein said body radial cross section includes a pair of substantially circular portions respectively projecting axially of opposite sides of said tooth element roots.

6. In combination with a lock washer, as defined in claim 1, a rotary threaded fastener member having a clamping surface overlying said washer body, and radially projecting means on said rotary fastener axially spaced from said clamping surface and extending beneath said washer body for retaining the washer and the rotary fastener in preassembled relationship.

7. A combination, as defined in claim 6, wherein said rotary fastener clamping surface includes a first annular section overlying the tooth elements of the washer, and an axially recessed second annular section overlying the washer body, said rotary fastener including annular generally axially extending shoulder means between said first and second clamping surface sections engageable with an axially projecting portion of said washer body for preventing radial distortion of the washer body during loosening of the rotary fastener from a workpiece.

References Cited in the file of this patent

UNITED STATES PATENTS

| | | |
|---|---|---|
| 1,504,511 | Ross | Aug. 12, 1924 |
| 1,611,210 | Liddell | Dec. 21, 1926 |
| 2,424,208 | Poupitch | July 15, 1947 |